Jan. 25, 1955  H. S. CAMPBELL  2,700,424
GOVERNOR SYSTEM FOR ROTORCRAFT
Filed July 28, 1948  2 Sheets-Sheet 1

INVENTOR
HARRIS S. CAMPBELL
BY
ATTORNEYS

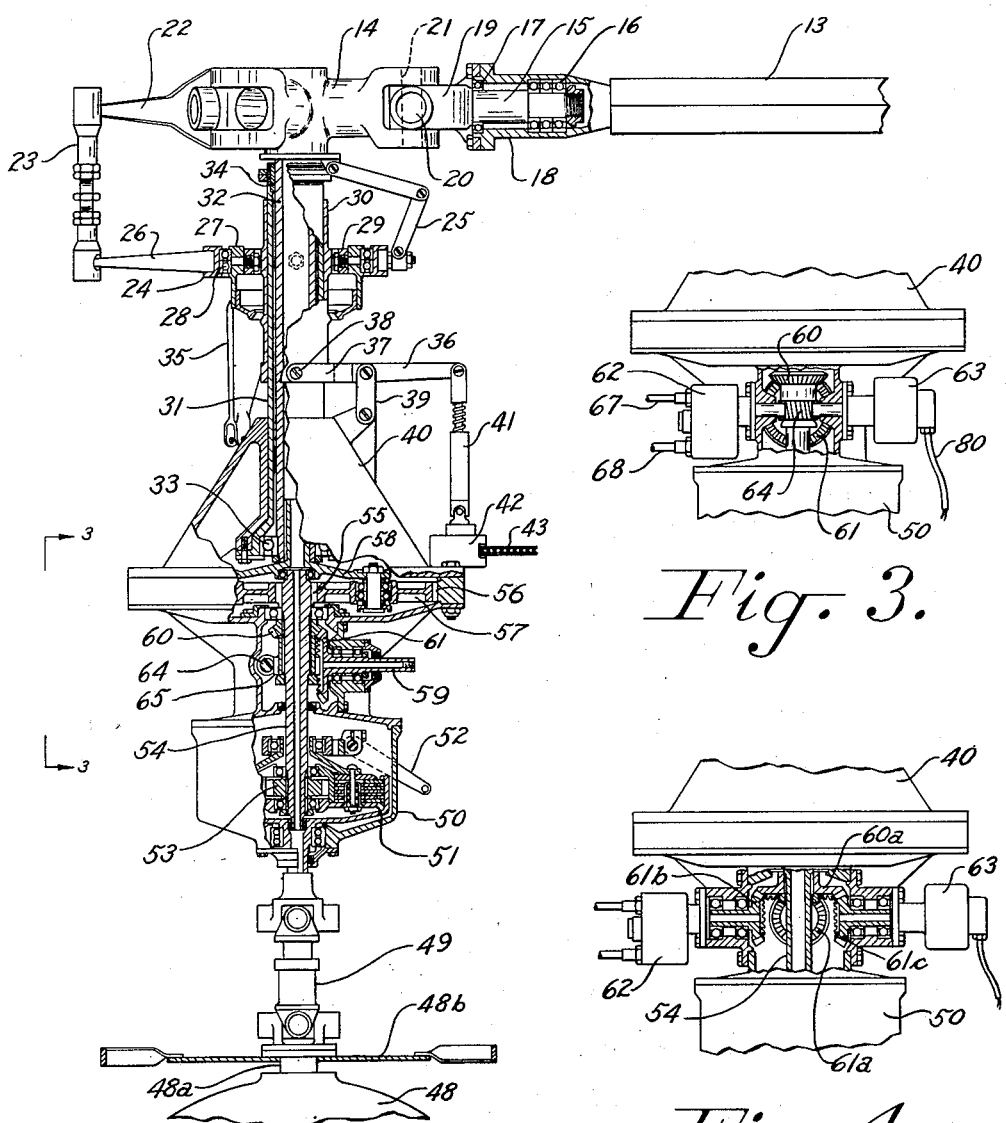

UnitedStates Patent Office 2,700,424
Patented Jan. 25, 1955

2,700,424

GOVERNOR SYSTEM FOR ROTORCRAFT

Harris S. Campbell, Bryn Athyn, Pa., assignor to The Firestone Tire & Rubber Company, Akron, Ohio, a corporation of Ohio Application July 28, 1948, Serial No. 41,142

3 Claims. (Cl. 170—135.75)

This invention relates to helicopters and is more particularly concerned with rotor systems therefor including mechanism for governing the rotor speed.

In helicopters it is customary to drive the main rotor by means of an engine and transmission system in which a free-wheeling or overrunning clutch device is provided to permit continued operation of the main rotor in the event of power failure. The normal operation of the aircraft to maintain accurate control of the lift and power requires that the rotor blades be mounted to permit collective pitch change thereby providing for the absorption of varying amounts of power by the rotor. In order to control the power applied to the rotor the engine throttle may be adjusted. In normal flight, particularly in hovering operations close to the ground such as during take-off and landing, the operator must be constantly making adjustment both for the power applied to the rotor and for the rotor pitch so that it reacts properly to the applied power. The reason for this continual adjustment is that power requirements vary considerably depending upon the external effects applied to the rotor such as the ground effect and the variation in airflow across the rotor due to changes in wind velocity or direction. Under certain conditions the constant effort of co-ordination of the engine throttle and pitch control induces fatigue on the operator.

It is an object of the present invention to provide an improved form of governor system for helicopter rotors which reduces the control co-ordination required in operation of the helicopter and at the same time allows more freedom of action on the part of the operator. By eliminating the need for continual adjustment of the rotor pitch one of the operator's hands is relieved of a considerable amount of work since only occasional operation of the throttle is needed.

A further object of the invention is the provision of a constant speed rotor governor which will act automatically to reduce the rotor pitch to the autorotational range in the event of power failure. Such a mechanism results in increased safety since it eliminates the need for rapid manual reduction of pitch under emergency conditions.

In order to incorporate the foregoing safety feature it is an object of the present invention to locate the drive mechanism for the rotor governing devices at a point where they are operated by the main rotor whether it is power driven or autorotationally driven.

Another object of the invention is to provide a hydraulic system for actuation of the pitch control mechanism under the response of the speed indicating mechanism in a fashion which permits the normal manual pitch control system to be retained. The invention preferably involves the proportioning of the governor developed forces in a fashion which permits the operator to override the automatic pitch actuation if desired.

A further object of the invention is the provision of means for easily engaging or disengaging the rotor governor into or out of the pitch control system.

It is also an object of this invention to provide means by which the governing speed may be quickly adjusted to different values.

With a governing system according to the present invention the control of the aircraft becomes considerably simplified. The operator through the manipulation of the throttle control to the engine increases or decreases the power as required to take care of the varying conditions of flight. The governor system automatically increases or decreases the rotor pitch to maintain a constant rotor speed while automatically providing for absorption of the power changes produced by changes in the throttle setting. The need for coordination of throttle and pitch change actions is eliminated with the result that the operator is required to provide less mental concentration and less manual effort in the control. A further advantage is that with a given throttle setting, the rotor will maintain a constant speed and a constant power absorption. The throttle, therefore, may be given less attention that is normally required.

How these objects and advantages are attained will be clear from the following description of the drawings in which—

Figure 2 is an elevational view of a rotor hub and transmission system suitable for use with the present invention, parts of the mechanism being shown in section.

Figure 3 is a view taken in the direction of arrows 3—3, Fig. 2, with part of the housing shown broken away to illustrate the drive for the governor accessories.

Figure 4 is a view partly in section showing an alternate drive for the governor accessories.

Figure 1:
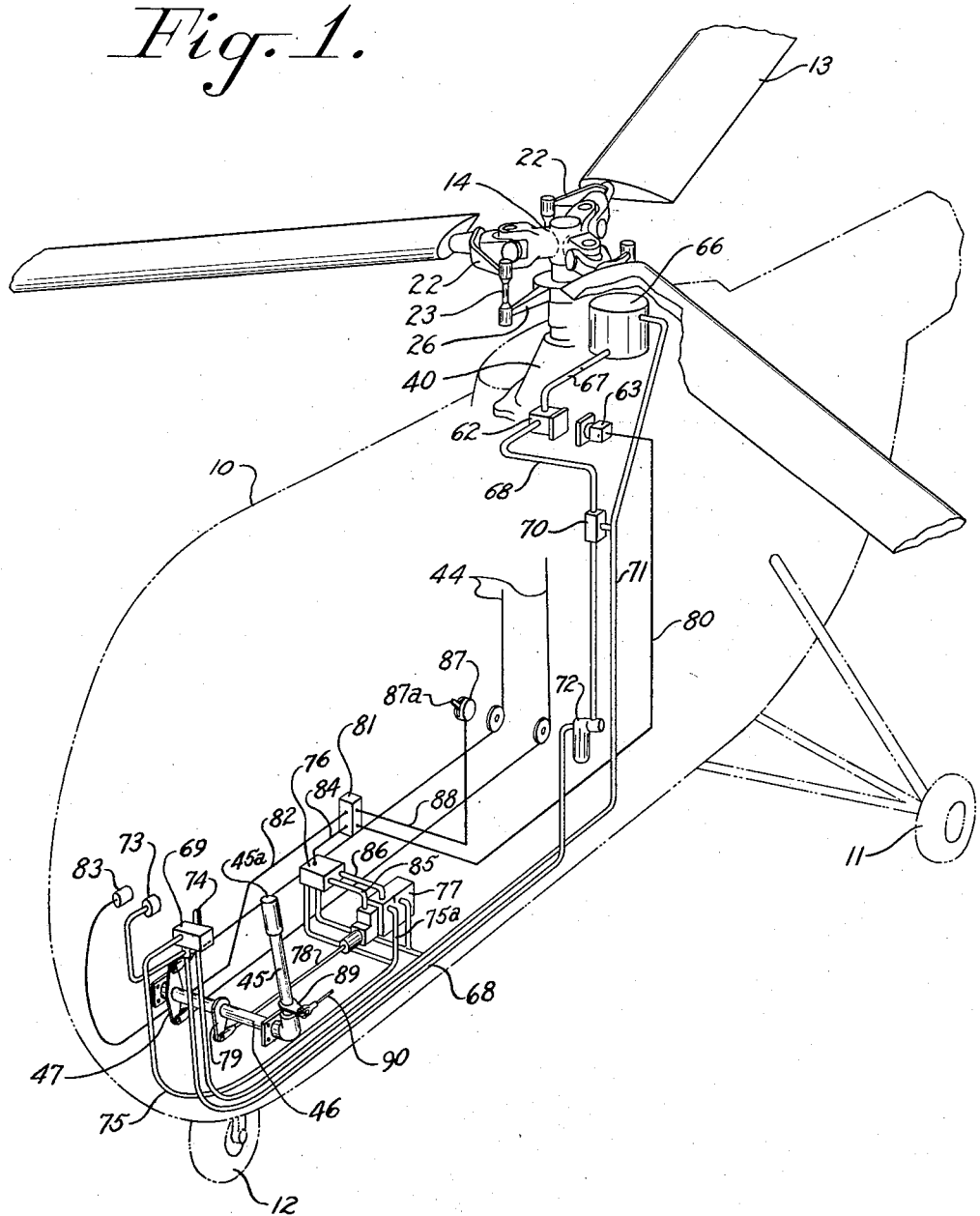
Figure 1 is a perspective outline of a portion of an aircraft illustrating the general arrangement of a governor apparatus according to the present invention.

In Figure 1 the outline of the body of the aircraft is indicated at 10. A landing gear composed of main landing wheels 11 and a nose wheel 12 supports the craft upon the ground. Rotor blades 13 which are connected to the rotor hub 14 are driven to provide the support and propulsion of the aircraft during flight. The blades 13 are mounted for pitch variation to permit control of the aircraft during flight. The pitch mounting construction for the blade is best shown in Fig. 2, where it will be seen that a spindle 15 is provided for the support of a plurality of thrust bearings 16 and a radial bearing 17. An outer cylindrical sleeve 18 houses the blade attaching bearings 16 and 17 and is connected with the blade structure to transmit the various operating forces developed by the blade. The spindle 15 is connected to fork 19 which in turn is attached to the hub 14 by means of a suitable flapping pivot 20 and drag pivot 21. An arm 22 is connected to the cylinder 18 and extends forwardly to a point suitable for connecting the pitch control rod 23. (See Fig. 1).

In order to provide for control of the cyclic pitch of the blades for positional control of the aircraft and also for control of the collective pitch of the blades to control the absorption of power for different flight conditions, a swash-plate construction is provided which may be universally tilted and also moved vertically. The outer ring 24 of the swash plate is caused to rotate with the hub 14 by a scissors linkage 25. Three radially extending arms 26, one for each blade, are attached to outer ring 24, the outer end of each arm 26 being connected to the lower end of a push rod 23. The upper and lower ends of push rod 23 are preferably connected by means of universal or ball joints to permit transmission of control forces at a variety of angles. The outer rotating part 24 of the swash-plate is supported on the inner non-rotating ring 27 by means of suitable bearings 28. Ring 27 is pivotally connected to gimbal ring 29 which in turn is pivotally attached to sleeve 30. Sleeve 30 is mounted for vertical sliding motion on the cylindrical housing 31 which supports the rotating axle 32. Hub 14 is attached to the upper end of axle 32. Bearings 33 and 34 are provided between the rotating axle 32 and the housing 31.

Cyclic pitch control of the blades is attained by tilting the swash-plate with respect to the sleeve 30. This tilting action is controlled by connections (not shown) to the flight control stick. The control connections terminate at the pair of depending arms, one of which is shown at 35. The collective or simultaneous pitch control of the blades, with which the present invention is primarily concerned, is accomplished by raising or lowering the sleeve 30 to which the swash-plate assembly is connected. For the purpose of moving the sleeve 30 a lever 36, which has a fork 37 partly encircling the sleeve 30 and connected therewith by pivot 38, is mounted to transmit to the sleeve. A link 39 pivotally supports the lever 36 on the hub base 40. The controls for operating the collective pitch include a screw-jack unit 41, the lower end of which is connected to the hub base 40 by housing 42 in which there may be located a sprocket which is suitably connected to the screw-jack 41 to transmit rotational movement. A chain 43 operates the sprocket, chain 43 in turn being connected to cables 44 (see Fig. 1). The pilot's collective pitch control lever 45 is connected to a transverse torque shaft 46 to which levers 47 are fastened. Cables 44 are connected to the ends of levers or arms 47 and thus transmit movements of the control member 45 to the swash-plate.

The power is transmitted from the engine 48 to the rotor through suitable clutches and gearing which are clearly shown in Fig. 2. Here it will be seen that the engine shaft 48a to which is connected the fan and flywheel unit 48b, drives the universally jointed extension shaft 49 which is connected to the clutch unit 50. The clutch unit includes a multiple disc clutch 51 which may be engaged or disengaged by means of lever 52. In series with friction clutch 51 there is a free-wheeling or overrunning clutch unit 53 which is provided to allow the rotor to automatically overrun the engine drive so that the rotor may continue operating under aerodynamic actuation in the case of engine failure. The overrunning clutch 53 is connected to shaft 54 which in turn incorporates the pinion gear 55. External ring gear 56 and planet gears 57 provide the reduction gearing necessary to reduce the engine speed to the rotational speed required for operation of the rotor. Thus, the planet gears 57 are connected to drive the rotor axis 32, the spider or cage 58 being provided for this purpose.

In single rotor aircraft of the type illustrated in Fig. 1, it is customary to provide for the counteraction of rotor torque and also for directional control of the aircraft by means of an anti-torque rotor which may be mounted at the rear end of the fuselage structure. The power is supplied to the tail rotor unit from the main transmission by means of shaft 59 which is driven by suitable bevel gears 60 and 61, the gear 60 being connected to the shaft 54 in a fashion which assures drive of the tail rotor at all times even though the engine may be disconnected from the rotor drive.

In the governor system of the present invention a power unit in the form of a hydraulic pump is used to supply the energy for operating the blade pitch to produce the governing action. The pump unit is illustrated at 62 in Fig. 3. A tachometer unit 63 is used to provide the control of the governor system. These units are mechanically driven by means of the worm gear members illustrated at 64 and 65, the latter being connected with the shaft 54 so that units 62 and 63 are driven at all times when the rotor is in operation, whether driven by the engine 48 or driven autorotationally.

Another drive arrangement for the pump and tachometer generator is shown in Fig. 4. In this system the bevel gear 60a is connected to be driven by shaft 54. Meshing with gear 60a and driven by it are three bevel gears, gear 61a being connected to the drive for the torque counteracting rotor. Gear 61b is connected to drive the pump 62 and gear 61c drives the tachometer generator 63. With this arrangement a single driving gear attached to the vertical shaft is used to transmit power to all three auxiliary drives and thus a reliable and simple drive system is provided.

Referring to Fig. 1, it will be observed that the governor system is arranged to operate the collective pitch of the rotor blades, a hydraulic system being provided to move the controls. The hydraulic pump 62, the mechanical drive of which was described above, is supplied with fluid from a reservoir 66 through line 67. A high-pressure line 68 leads from the pump 62 to the control valve 69 which may be conveniently located within reach of the pilot. In line 68 a pressure regulating valve 70 is inserted to regulate the pressure delivered to the system to a predetermined value. A by-pass connection is provided between regulating valve 70 and the hydraulic return line 71 which delivers the oil back to the reservoir 66. A filter unit 72 is also inserted in line 68 to remove any dirt which might cause faulty functioning of the system. A pressure gauge 73 is connected to the line 68 so that the operator may check the delivered pressure at any time to determine proper operation of the system.

The control valve 69 has a handle 74 which may be moved to either operative or inoperative position. When in inoperative position the fluid delivered through line 68 is permitted to return to the reservoir through return line 71 and the line 75 from the control valve 69 to the actuating mechanism is closed. When the handle 74 is moved to operative position the pressure from line 68 is admitted into line 75 so that pressure is available at the control unit 76 and the actuating cylinder unit 77. A piston rod 78 connects the actuating cylinder 77 with the collective pitch control shaft 46 by means of lever arm 79 so that movements of the piston rod 78 cause operation of the collective pitch.

An electrical system is provided to control the motions of the actuating unit 77 in a fashion to react properly to speed changes in the rotor system. The electric rotor tachometer 63 which, as was previously described, is mechanically connected with the rotor system, responds to any speed change of the rotor. An electrical lead 80 runs from the electric tachometer 63 to the junction box 81. Another lead 82 runs from the junction box 81 to the tachometer instrument 83 located in a position which is clearly visible to the operator so that the rotor speed may be read at any time.

Suitable connections 84 join the junction box 81 and the hydraulic control unit 76. Any variation in speed affects the electrical output of the generator 63, thus increasing or decreasing energy supplied to the control unit 76. While the details of construction of the control to the servo unit 77 are not directly a part of the present invention a general description of a suitable arrangement is given for purposes of understanding the operation of the mechanism. Since the servo or actuating cylinder 77 is double-acting, two pressure lines 85 and 86 lead from the control unit 76 to the servo unit 77. When a change in the electrical output occurs this actuates a valve in unit 76 to admit pressure to either line 85 or line 86, depending upon whether the speed change in the rotor calls for an increased or a decreased pitch for correction purposes. The pressure from lines 85 and 86 in turn control the admission of pressure from branch 75a into one end or the other of the servo cylinder to give motion of the piston which is connected to piston rod 78. Movement is thus initiated in the correct direction to change the pitch sufficiently to return the rotor speed to the governed value.

The internal construction of the valve and servo-mechanism need not be considered in detail since suitable equipment for this purpose has been previously developed and disclosed. An example of electrically actuated valve means to control the application of pressure to a cylinder for changing blade pitch is disclosed in U. S. Patent 2,229,058, issued to T. A. Dicks on January 21, 1941.

Provision is made for manual adjustment of the speed at which governing is to be held. This is accomplished in the present system by the rheostat unit 87 which is connected into the system through suitable connections illustrated at 88 leading to the junction box 81. By moving the control handle 87a the pilot may adjust the rotational speed at which the rotor governor operates to maintain constant speed. This is of considerable advantage since during cross-country flying it is often desirable to reduce the engine and rotor speed in order to save wear and tear on the engine and transmission.

The throttle control for the engine may be conveniently connected with the pitch control lever 45 in any convenient manner such as by rotation of the hand grip 45a. Rotation in this fashion causes movement of the lever 89 and operation of the throttle rod 90. Thus, during operation of the aircraft with the governing system disengaged the operator manually controls the rotor pitch and the throttle setting with one hand. When the governor system is in operation the pilot may give full attention to operation of the throttle since the pitch change is taken care of automatically to maintain constant speed of the rotor regardless of throttle setting. During normal flight operation exclusive of landing or take-off operations, the throttle may be left free so that only the positional flight controls, that is, the normal control stick and rudder pedals, require attention from the operator. An important feature of this governing system is that in case of sudden engine failure the governor automatically reduces the rotor pitch to a value such that rotational speed is maintained under autorotational forces.

In a governing system of this nature it is preferred that the forces developed by the servo system for actuation of the pitch control should be sufficiently low to permit them to be overpowered by the operator at any time without the need for disconnecting the governor system by closing the valve 69. With this type of governing system various follow-up devices may be incorporated to anticipate speed changes, such as for throttle movement. Such devices assist in obtaining extremely accurate governing action and reduce hunting.

From the foregoing it will be seen that this rotor governor system provides for accurate speed control in a fashion which utilizes effectively the normal collective pitch control system of the aircraft while still allowing the manual operation. A versatile governing system is thus provided which may be adjusted readily to various speeds of operation or may be disconnected by merely turning a valve. The governing action is independent of the engine and provides for automatic blade pitch change in case of power failure, thus incorporating an important safety feature. The use of the normal electric tachometer provides a simple and accurate control means for the governing system.

I claim:
1. A helicopter rotor control mechanism comprising a rotor having pitch change mechanism associated therewith, a rotor drive including an input shaft having overrunning clutch means and a speed reduction unit interposed therein, a hydraulic pump and tachometer generator apparatus, said apparatus geared to and driven from said input shaft intermediate said overrunning clutch means and rotor, said apparatus being operatively associated with said rotor pitch change mechanism.

2. A helicopter rotor having blades mounted for collective pitch change, pitch mechanism including an operator's control member, control interconnections between said member and said blades to cause actuation of blade pitch upon movement of said member, a power plant, a transmission system between said power plant and said rotor including a speed reduction unit adjacent said rotor, an input shaft to said unit, rotor governor mechanism including an electrical tachometer generator and a hydraulic pump driven from said input shaft, a freewheeling clutch located in said transmission system between said power plant and said generator and pump.

3. A helicopter rotor and drive system having blades mounted for collective pitch change, control mechanism for changing blade pitch, an engine, a transmission from said engine to said rotor including a clutch device to disconnect said engine from said rotor to allow autorotational operation to provide lift, rotor speed governing equipment including a hydraulic pump and an electrical tachometer generator having drive connections to said transmission between said clutch and said rotor to provide drive during autorotational operation of said rotor.

References Cited in the file of this patent
UNITED STATES PATENTS

| | | |
|---|---|---|
| 2,301,434 | McNeil | Nov. 10, 1942 |
| 2,327,370 | Pullin | Aug. 24, 1943 |
| 2,377,457 | Stalker | June 5, 1945 |
| 2,378,617 | Burke | June 19, 1945 |
| 2,405,488 | Briner | Aug. 6, 1946 |
| 2,423,191 | Kopp | July 1, 1947 |
| 2,428,128 | Sheppard | Sept. 30, 1947 |
| 2,471,904 | Seibel | May 31, 1949 |
| 2,517,150 | Webb | Aug. 1, 1950 |

FOREIGN PATENTS

| | | |
|---|---|---|
| 212,020 | Switzerland | Jan. 16, 1941 |

OTHER REFERENCES

"Aviation," November 1944, pages 125–133, "Basic Drives for Helicopters."